United States Patent [19]

Christ et al.

[11] 4,242,361

[45] Dec. 30, 1980

[54] PREPARATION OF SAUERKRAUT

[75] Inventors: Charles Christ, Connerre; Jean-Michel Lebeault, Villiers; Claude Noel, Compriegne, all of France

[73] Assignee: Marc-Roger Hirsch, Paris, France

[21] Appl. No.: 825,487

[22] Filed: Aug. 17, 1977

[30] Foreign Application Priority Data

Oct. 14, 1976 [FR] France .................... 76 30874
May 31, 1977 [FR] France .................... 77 16465

[51] Int. Cl.³ ............................................... A23B 7/10
[52] U.S. Cl. ........................................ 426/49; 426/8; 435/317
[58] Field of Search ................... 426/8, 49, 15, 16; 19.5/143, 144; 99/276; 435/317

[56] References Cited

U.S. PATENT DOCUMENTS

| | | | |
|---|---|---|---|
| 2,345,814 | 4/1944 | Harrison | 426/49 |
| 3,867,551 | 2/1975 | Jaegle | 426/16 |
| 3,871,272 | 3/1975 | Melandri | 99/276 |
| 3,891,771 | 6/1975 | Green et al. | 426/49 X |

*Primary Examiner*—David M. Naff
*Attorney, Agent, or Firm*—Schwartz, Jeffery, Schwaab, Mack, Blumenthal & Koch

[57] ABSTRACT

When fermenting and ensilaging material such cabbage to produce sauerkraut, liquid is recycled during fermentation from the bottom of an ensilaging container to the top of the container and evenly distributed over the top of material in the container to prevent dehydration of the material being fermented.

The temperature of the recycled liquid can be controlled and various substances can be added to the recycled liquid.

5 Claims, 3 Drawing Figures

PREPARATION OF SAUERKRAUT

BACKGROUND OF THE INVENTION

1. Field of the Invention

The invention relates to a process and apparatus for ensilaging vegetable materials, animal materials and the like. The ensilaging comprises subjecting the vegetable or animal material to a humid atmosphere so as to promote anaerobic fermentation of carbohydrates present in the materials.

2. Description of the prior art

U.S. Pat. No. 3,753,731 teaches a process and apparatus for fermentation in a vacuum in an airtight container. A container is disclosed having evacuation means attached to it and whose contents, when closed, are out of contact with the atmosphere.

While the process and apparatus disclosed have proved advantageous, they nevertheless suffer from the fact that the upper layer of material being fermented or ensilaged tends to dry out. This dehydration results in uneven fermentation or ensilaging which results in a product having non-uniform properties. Additionally, in such containers the rate of acidification as for example in the manufacture of sauerkraut cannot be easily controlled.

BRIEF DESCRIPTION OF THE INVENTION

It is thus an object of the invention to provide an improved method and apparatus for fermenting and ensilaging in which the above disadvantages may be overcome and in which dehydration of the material being ensilaged is avoided.

It is a further object of the invention to provide a method for ensilaging vegetable and animal materials, and in particular cabbage for the production of sauerkraut.

As used herein, the term "ensilage" refers to the conservation in a moist state of animal and vegetable materials as a result of acidification caused by anaerobic fermentation of carbohydrates present in the materials being treated.

It is a further object of the invention to provide a high yield ensilage process for forage and vegetable material in general in which climatic effects on the process are minimized and in which costs are reduced. The process further permits the recovery of industrial by-products of animal and vegetable origin as well as their reuse.

The present invention has additionally as an object to provide a process and apparatus in which the rate of acidification can be controlled and increased, as in the case of sauerkraut production, for example. As a result of the rapid acidification possible with the invention, the material being treated does not have a chance to spoil or putrify in the course of the parisitic fermentation. The device of the invention thus comprises means for adding materials which regulate the pH of the mass treated to control its quality.

A further object of the invention is to provide an ensilaging process as well as an apparatus therefor in which the material being ensilaged is rehydrated. Preferably, the rehydration takes place with juice removed from the bottom of the container in which the ensilaging of the animal or vegetable material, which may under certain circumstances be treated with salt, takes place. When necessary, a nutrient solution or a suspension of appropriate microorganisms can be added to the juice while it is being recycled.

It is a further object of the invention to provide a device and method for heating or cooling the juice recycled from the bottom of the container. The ensilage device comprises a closable container adapted to contain a liquid and a material to be ensilaged having recycle means for the recirculation of said liquid removed from the bottom of the container and added to the top of the container to prevent drying out and waste of the material being ensilaged. Preferably the device is outfitted with piping means through which the liquid may be heated and cooled. Heat exchange takes place preferably by contacting the recycle juice with a heat exchange fluid flowing countercurrently. The heating and cooling may be used to accelerate or retard the effects of recycling of the juice.

It is a further object of the invention to provide for improved distribution means for the recycled liquid to effectively distribute it over the material to be ensilaged. In one embodiment of the invention a porous or permeable membrane is provided for this purpose. Alternatively, a liquid distributor plate having orifices distributed over its surface may be used.

An additional object of the invention is to provide an improved method and apparatus for the fermentation of sauerkraut.

The conventional sauerkraut fermentation process occurs in three stages. During the first stage the cabbage is fermented. The fermentation is accompanied by significant production of carbon dioxide which is required for subsequent fermentation. The length of this stage depends on the temperature used. For example, it may continue for 48 hours at about 10° C. to about two weeks at 26° C. During the second or neutral stage of the process there is no apparent activity. This period may continue for anywhere from about 10 days to a month depending upon the temperature. Finally, in the third and final stage the material becomes acidified and is accompanied by the slight evolution of carbon dioxide.

It is during the third or final stage in which, in conventional devices, a superficial drying of the sauerkraut occurs. This drying results in the loss of the top 5 to 10 cm of the sauerkraut. It additionally results in impairment of the quality of the product.

It is thus an object of the invention to provide improvements in the production of sauerkraut in which the sauerkraut is rehydrated during the third and final acidification stage by the recycling of juice present within the container in which the sauerkraut is acidified.

DETAILED DESCRIPTION OF THE INVENTION

Figure 1:
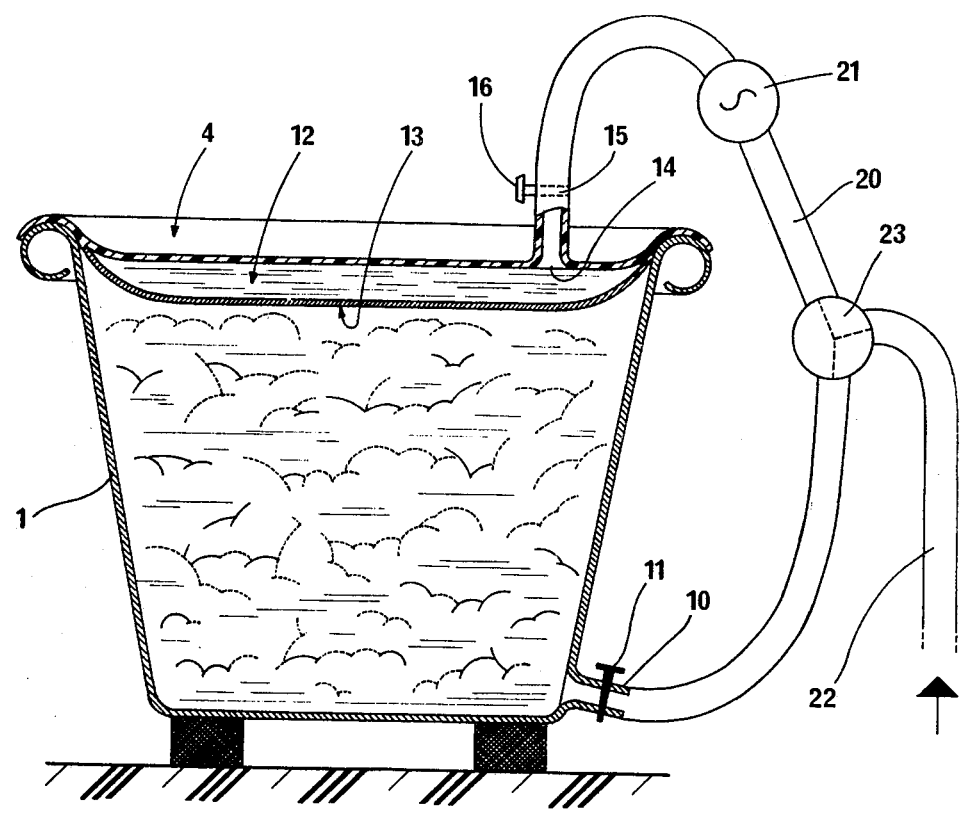
FIG. 1 illustrates an ensilaging apparatus according to the first embodiment of the invention.

FIG. 1 illustrates one embodiment of the apparatus which may be used for performing the method of the invention. As shown, a mass of cabbage in the third phase of the fermentation process is placed in a closed container 1 of the type illustrated in U.S. Pat. No. 3,753,731, the disclosure of which is herein incorporated by reference. This apparatus includes an airtight container, preferably suitable for storage on a pallet which is equipped with means for creating a vacuum inside it.

According to one embodiment of the present invention, the container consists of an airtight vat, at least part of one side of which, and preferably the lid, is made of a flexible membrane. The container is covered with a flexible top 4. Although cabbage is illustrated, the invention is by no means limited in this respect and may be used for the anaerobic fermentation of any material desired such as forage or any vegetable material. For example, hay, grass, corn, turnips, alfalfa and clover may be so treated. Additionally, food waste, agricultural waste, slaughterhouse waste, canning waste such as fish material and the like may all be treated by the illustrated apparatus.

After the container has been filled to the desired extent and capped by cover 4, it is evacuated. Removal of carbon dioxide is not detrimental during the acidification stage. Once evacuated, anaerobic fermentation and acidification occur. As illustrated, container 1 is provided with a piping system. By virtue of this system, liquid may be added to the top of the container 1 through feedline 20 with the aid of pump 21. Alternatively, liquid may be added by simply removing the top of the container and adding liquid into the open container.

The liquid added may be either totally fresh, recycled or a mixture of the two in any desired proportions. The added liquid serves to rehydrate the cabbage mass, thus reducing waste. It may comprise salt, sauerkraut juice and/or a nutritive solution containing for example pure yeast or a selected bacteria. Of course, the bacteria chosen will depend on the mass being treated and the results desired. When treating cabbage to make sauerkraut, salt is added to the cabbage. Additionally, materials may be added to the solution to control the pH within the container, thus stabilizing the quality of sauerkraut produced.

Recycling of the liquid may be accomplished by withdrawing liquid from the bottom of the container such as for example through an outlet 10. A valve or spigot 11 is provided for controlling the rate at which the liquid is removed. The recycled liquid is then forced up through valve 23 by pump 21 through opening 14. Liquid flow rate into the container may be controlled by a spigot 16 attached to ferrule 15.

When fresh liquid is to be added by means of pump 21, valve 23 is adjusted such that the line below the valve is closed and so that line 22 is free to feed into line 20. Line 20 is connected to a source of rehydration liquid, not shown. The rehydration liquid may comprise either water, saltwater, sauerkraut juice, a nutritive solution or a solution of yeast or bacteria, either alone or in combination and in any desired proportions. As noted previously, when treating cabbage to make sauerkraut, salt is preferably added. The salt may be added initially or in the course of the recycle.

The liquid being fed into the top of the container serves to rehydrate the mass being treated. FIG. 1 illustrates a pocket 12 which lines the flexible cover 4. While the pocket is illustrated as being adjacent to the cover, it might just as well be spaced from and independent of the cover. The bottom wall 13 of the pocket is porous.

When the rehydration liquid is fed through opening 14, it fills up pocket 12 and is then caused to diffuse through porous membrane 13 into the container. By virtue of the pocket, the rehydration liquid is thus thoroughly distributed over the upper surface of the cabbage.

It should be noted that while the apparatus illustrated in FIG. 1 uses lines 20 and 22, these need not necessarily be used in combination with the pocket 12, as for example when the rehydration liquid is directly added through the top of the container.

Furthermore, the introduction of liquid into the top of the container, which in the case of the cabbage of the example occurs during the beginning of the acidification phase, may be repeated as many times as is necessary to effect the desired result and to minimize waste of the material being treated.

Figure 2:
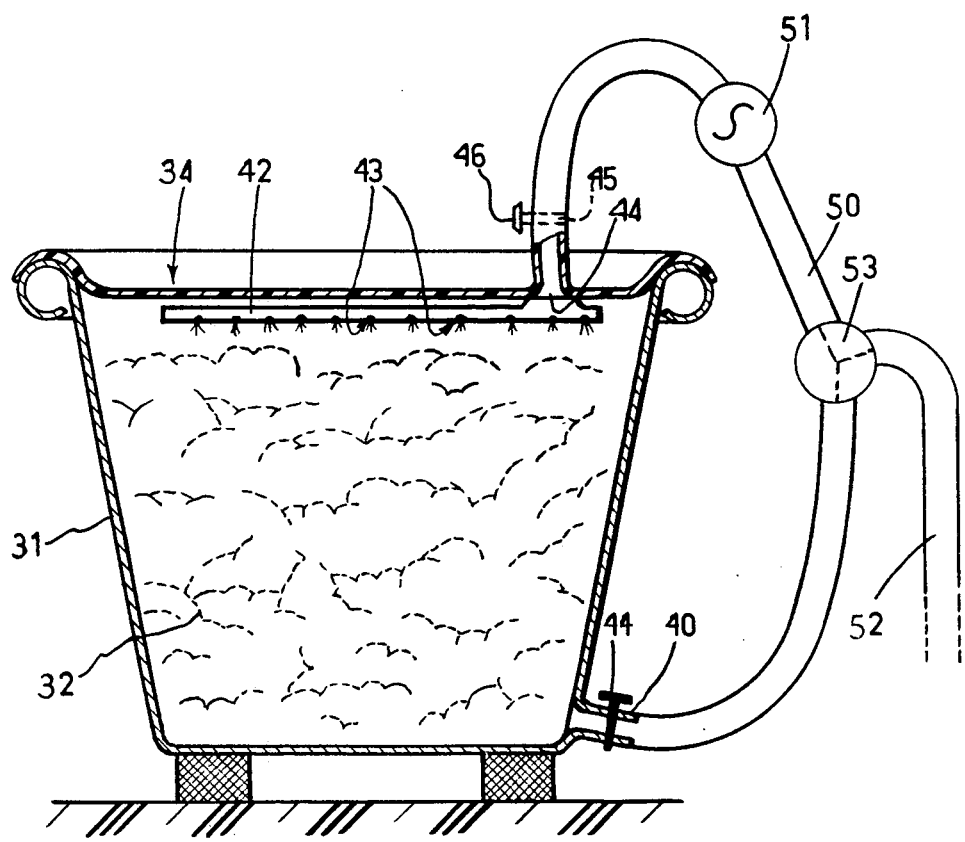
FIG. 2 illustrates an ensilaging apparatus according to a second embodiment of the invention.

FIG. 2 illustrates an apparatus similar to that of FIG. 1. A container 31 is filled with a mass 32 to be treated. The container is fitted with a piping system for feeding, removing and recycling liquid from the container. Liquid may again be fed initially through line 52. The flow of liquid is governed by pump 51 in conjunction with valve 53. The outlet 70 at the bottom of the container is provided with a spigot 41 and the inlet at the top of the container is provided with spigot 46 and ferrule 45. The rehydration liquid feeds into the distributor 42 through opening 44. Again, by adjusting valve 53, it is possible to adjust the recycle as well as to add additional materials such as a suspension of microorganisms, yeast, a nutritive solution or in the case of sauerkraut production, a salt solution.

The device of FIG. 2 is provided with a liquid distributor for evenly distributing the rehydration liquid. The distributor is provided with individual delivery orifices for assuring even distribution. The distributor may comprise a platelike member or a series of crossed pipes.

Although two types of distributors have been exemplified in the two preceding examples, it should be understood that any type of liquid distributor may equally be used as long as it provides an even distribution of the rehydration liquid.

As in the previous embodiment, the distributor device may be used without the recycle means illustrated.

Figure 3:
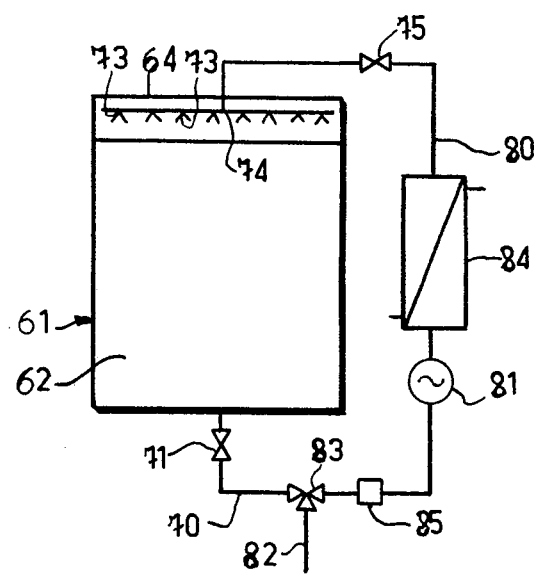
FIG. 3 is a schematic representation of an ensilaging apparatus having heat exchange means.

FIGS. 3 and 4 illustrate devices analogous to those illustrated in the first two examples except that provision is made for heat exchange of the recycled liquid.

In FIG. 3 a container 61 filled with a mass 62 to be treated is fitted with a piping system for feeding and recycling liquid to the container through distributor 74 through orifices 73. The liquid leaves the container through line 70, the flow being controlled by valve 71. Means 75 and 85 are provided for analyzing the content of the liquid being recycled. A heat exchanger 84 is provided for heating or cooling the liquid being circulated by the pump 81. The heat exchanger used is preferably of the countercurrent type although cocurrent exchangers may be used. Fresh liquid may be fed to the system through line 82 controlled by valve 83.

In an embodiment not shown, the device described in FIG. 3 may be outfitted with a second heat exchanger either of the same type or different than the first, having its own recycle, feed, etc. and having its own piping system identical or similar to that shown in FIG. 3. The line leaving the heat exchanger also feeds the distributor. In such an embodiment one heat exchanger may cool while the other heats, thus making possible the addition of either cooled or heated liquid.

The drawings and specifications present a detailed disclosure of preferred embodiments of the invention. It is to be understood however that the invention is not limited to the specific devices and methods disclosed but covers instead all modifications, changes and constructions falling within the scope of the invention as it is defined by the claims.

We claim:

1. In a process for fermenting cabbage to produce sauerkraut, comprising the steps of placing salt and the cabbage in a container and closing the upper end of said container with an airtight cover, fermenting said cabbage in an active fermentation phase wherein carbon dioxide is evolved, a neutral fermentation phase and a final acidifying fermentation phase, the improvement comprising the steps of:

removing a controlled amount of sauerkraut juice from the bottom of said container during said acidifying phase;

maintaining said removed juice at a predetermined temperature;

analyzing the removed juice and controlling the pH;

re-introducing said removed juice into said container through an aperture provided in said cover; and evenly distributing the re-introduced juice over the top surface of the cabbage in the container by passing said juice through a porous membrane or a sieve-like plate provided with holes disposed above the top surface of said cabbage.

2. The process of claim 1 further comprising admixing a selected portion of fresh liquid with the removed juice prior to reintroducing the juice into the container.

3. The process of claim 1 further comprising admixing a nutritive solution with said removed juice prior to reintroducing the juice into said container.

4. The process of claim 1 wherein said step of maintaining the removed sauerkraut juice at a predetermined temperature is performed by passing the juice through a heat exchanger placed between a juice outlet provided at the bottom of said container and a juice inlet provided in said cover of the container.

5. The process of claim 2 wherein said step of admixing a selected proportion of fresh liquid with said removed sauerkraut juice is performed by means of an adjustable three-way valve which is interposed between said juice outlet and said juice inlet, and which is connected to a source of fresh liquid.

* * * * *

UNITED STATES PATENT AND TRADEMARK OFFICE
CERTIFICATE OF CORRECTION

PATENT NO. : 4,242,361
DATED : December 30, 1980
INVENTOR(S) : Charles Christ et al It is certified that error appears in the above—identified patent and that said Letters Patent is hereby corrected as shown below:

On page 1, under item (73) Assignee:
delete "Marc-Roger Hirsch, Paris, France" and
insert--Charles Christ, Connerre, France --.

In the Abstract, line 1, after "such"
insert--as --.

In Figure 2 of the drawings, delete the reference numeral "44" identifying the spigot on outlet 40 and insert therefor--41 --.

Column 4, line 22, delete "70" and insert therefor
--40 --.

Column 4, line 33, after "orifices" insert--43 --.

Column 4, line 51, after "Means" delete--75 and --.

Signed and Sealed this

Twelfth Day of May 1981

[SEAL]

Attest:

RENE D. TEGTMEYER

Attesting Officer     Acting Commissioner of Patents and Trademarks